(12) United States Patent
Jeong

(10) Patent No.: US 11,960,150 B2
(45) Date of Patent: Apr. 16, 2024

(54) PINHOLE GLASSES

(71) Applicant: Yon U Jeong, Seoul (KR)

(72) Inventor: Yon U Jeong, Seoul (KR)

( * ) Notice: Subject to any disclaimer, the term of this patent is extended or adjusted under 35 U.S.C. 154(b) by 318 days.

(21) Appl. No.: 17/205,557

(22) Filed: Mar. 18, 2021

(65) Prior Publication Data

US 2022/0299798 A1    Sep. 22, 2022

(51) Int. Cl.
*G02C 7/16* (2006.01)
*G02C 9/04* (2006.01)
*G02C 11/00* (2006.01)
*H04R 1/02* (2006.01)
*H04W 4/80* (2018.01)

(52) U.S. Cl.
CPC .................. *G02C 7/16* (2013.01); *G02C 9/04* (2013.01); *G02C 11/10* (2013.01); *H04R 1/028* (2013.01); *H04R 2420/07* (2013.01); *H04W 4/80* (2018.02)

(58) Field of Classification Search
CPC .......... G02C 7/165; G02C 11/10; G02C 9/04; G02C 9/00; H04R 1/028; H04R 2420/07; H04W 4/80
USPC ........................................................... 351/46
See application file for complete search history.

(56) References Cited

U.S. PATENT DOCUMENTS

| | | | | | |
|---|---|---|---|---|---|
| 1,804,922 | A | * | 5/1931 | Feltman ................... | G02C 9/04 2/13 |
| 2,012,620 | A | * | 8/1935 | Bean ......................... | G02C 7/16 2/13 |
| 2,020,033 | A | * | 11/1935 | Kitchin ..................... | G02C 7/16 2/12 |
| 2,663,021 | A | * | 12/1953 | Douglass .................. | G02C 7/16 2/433 |
| 3,507,566 | A | * | 4/1970 | Knapp ...................... | G02C 7/165 2/431 |
| 3,967,885 | A | * | 7/1976 | Byler ........................ | G02C 11/12 351/46 |
| 5,428,409 | A | * | 6/1995 | Silverstein ............... | G02C 7/105 351/44 |
| 5,485,227 | A | * | 1/1996 | Lin ............................ | G02C 7/12 351/49 |
| 7,857,448 | B2 | * | 12/2010 | Huang ...................... | G02C 7/165 351/159.52 |
| 2006/0139568 | A1 | * | 6/2006 | Kitayama ................. | G02C 7/165 351/46 |
| 2008/0018859 | A1 | * | 1/2008 | Gauger ..................... | G02B 30/40 359/462 |
| 2009/0316106 | A1 | * | 12/2009 | Kitayama ................. | A61F 9/04 351/46 |

(Continued)

FOREIGN PATENT DOCUMENTS

KR         10-1436530 B1      9/2014

*Primary Examiner* — William R Alexander
(74) *Attorney, Agent, or Firm* — NKL Law; Jae Youn Kim

(57) ABSTRACT

Proposed are pinhole glasses, which include a spectacle frame; spectacle lenses coupled to the frame; and temple bars hinged to both sides of the frames to be attached to the ears, wherein the pinhole part in which a plurality of pinholes are formed is detachably coupled to the frame inside the spectacle lenses. The pinhole glasses can be worn in everyday life. Smartphone, computer monitor, or fine print can be clearly seen through the glasses. In addition, the speaker formed on the temple bar of the glasses can replace earphones, so that it is possible to listen to various acoustic sounds by interlocking with a smartphone.

10 Claims, 10 Drawing Sheets

(56) References Cited

U.S. PATENT DOCUMENTS

| | | | | |
|---|---|---|---|---|
| 2010/0053542 A1* | 3/2010 | Kitayama | ................ | G02C 5/12 |
| | | | | 351/46 |
| 2011/0170047 A1* | 7/2011 | Shuster | ................ | G02C 7/165 |
| | | | | 351/111 |
| 2014/0253867 A1* | 9/2014 | Jiang | ................ | G02C 11/10 |
| | | | | 351/158 |
| 2014/0268030 A1* | 9/2014 | Castacane | ............. | G02C 7/165 |
| | | | | 351/159.52 |
| 2017/0251315 A1* | 8/2017 | Jannard | ................ | G02C 11/10 |
| 2019/0113774 A1* | 4/2019 | Anderson | .............. | G02C 5/143 |
| 2021/0306791 A1* | 9/2021 | Canberk | .............. | H04S 7/303 |
| 2022/0019092 A1* | 1/2022 | Borsoi | ................ | G02C 11/10 |
| 2022/0210922 A1* | 6/2022 | Uhm | ................ | H05K 1/148 |
| 2022/0248572 A1* | 8/2022 | Jung | ................ | G06F 1/163 |

* cited by examiner

PINHOLE GLASSES

BACKGROUND OF THE INVENTION

Field of the Invention

The present invention relates to pinhole glasses, and more particularly, pinhole glasses in which sound can be heard, and objects can be viewed from the front of the glasses in normal times, and letters can be clearly seen through the pinholes on the top of the glasses when viewing a smartphone, a computer monitor, or small letters.

Description of the Related Art

The prior art related to the present invention is Korean Patent No. 10-1436530. In modern life, a smartphone is an important personal belonging and a necessity that does not fall out of hand even for a moment. In addition to smartphones, computer monitors and large televisions also harm the health of the eyes, which are most important for the body.

Among them, smartphones cause dry eyes by looking at them in bright light for a long time near the eyes, and furthermore, they harm eye health with youthful presbyopia. In particular, when a person looks at the small letters on a smartphone for a long time with his gaze focused, the control muscles of the eyes become hardened and the eyesight deteriorates. In general, as a person gets older, objects appear more blurry after looking at a smartphone, and there are many difficulties in recovering vision.

Pinhole glasses using the pinhole effect are helpful in recovering from such deterioration of vision. These pinhole glasses are also effective for farsightedness and nearsightedness, especially helpful to suppress eye fatigue and restore vision by blocking bright light.

However, most of the pinhole glasses are generally used for vision correction. It is difficult to use pinhole glasses while suddenly checking the letters on a smartphone in a train or bus, or while driving therewith. Further, it looks strange to read a book or smartphone on a train or bus with pinholes glasses, unlike general glasses. In addition, it is inconvenient to put on and take off those glasses. Therefore, pinhole glasses are generally used only at home or in certain places.

SUMMARY OF THE INVENTION

The present invention has been made in view of the above problems, and it is an object of the present invention to provide pinhole glasses configured to clearly view objects at a distance from the front of the glasses, and small letters in a smart phone or a computer monitor, or at a close distance through pinhole part on the top of the pinhole glasses, the pinhole glasses being provided with speakers that enable sound listening in their temple bars.

In accordance with the present invention, the above and other objects can be accomplished by the provision of pinhole glasses comprising spectacle frames; spectacle lenses coupled to the frames; and temple bars hinged to both sides of the frames to be attached to the ears, wherein the pinhole part is coupled to the inside of the spectacle lenses, has pinhole lenses having a plurality of pinholes formed therein, and is detachably coupled to the spectacle frames.

As a preferred embodiment, the present invention proposes the pinhole glasses wherein the pinhole part has both pinhole lenses in a substantially half-moon shape connected by a connecting rod, and is screwed to the frames by screws passing through each pinhole lens.

As another preferred embodiment, the present invention proposes the pinhole glasses wherein the pinhole part has both pinhole lenses in the shape of a half-moon connected by a connecting rod, and fixing clips are provided on both pinhole lenses.

As still another preferred embodiment, the present invention proposes the pinhole glasses wherein the pinhole glasses further comprise a speaker installed in the temple bar and configured to transmit sound toward an ear and a control unit including a receiving unit embedded in the temple bar, connected to the speaker and to an external smartphone in a wireless way.

As still another preferred embodiment, the present invention proposes the pinhole glasses wherein the speaker includes a holder attached to a groove formed in the temple bar, and a perforated cover coupled to the holder, the holder being integrally formed or detachably coupled to the temple bar.

As still another preferred embodiment, the present invention proposes the pinhole glasses wherein the speaker is fastened to the temple bar, and the holder is coupled to the temple bar by a plurality of screws.

As still another preferred embodiment, the present invention proposes the pinhole glasses wherein the pinhole part includes a pinhole lens or a pinhole film having a plurality of pinholes to enable a pinhole effect, the pinhole lens being the same as the shape of about a third of the top of the frame and being made of a curved plate.

As still another preferred embodiment, the present invention proposes the pinhole glasses wherein the pinhole part includes a fixing clip to connect to the frame.

As still another preferred embodiment, the present invention proposes the pinhole glasses wherein the pinhole part includes a fixing clip provided on the upper portion thereof, a lens frame to which the pinhole part is coupled, and a connecting rod connecting the both frames.

As still another preferred embodiment, the present invention proposes the pinhole glasses wherein the pinhole part coupled to the fixing clip is configured to be inclined while being close to the eye.

As still another preferred embodiment, the present invention proposes the pinhole glasses wherein the pinhole is configured such that the diameter of the pinhole increases toward the eye and gradually decreases toward the spectacle lens.

In accordance with another embodiment of the present invention, there is provided pinhole glasses comprising spectacle frames; spectacle lenses coupled to the frame; and temple bars hinged to both sides of the frame to be attached to the ears, wherein the pinhole part is coupled to the inside of the spectacle lenses, includes pinhole lenses having a plurality of pinholes formed therein, and the pinhole part is made of a transparent display, and has a control unit for controlling color fluctuation and an on-off switch, a pinhole pattern is displayed on the transparent display by the on-operation of the switch.

As a preferred embodiment, the present invention proposes the pinhole glasses wherein the switch is provided on the temple bar.

As a preferred embodiment, the present invention proposes the pinhole glasses wherein the on-off operation of pattern formation of the transparent display is controlled by an application installed in the smartphone.

As a preferred embodiment, the present invention proposes the pinhole glasses wherein the transparent display shows various characters or information in conjunction with the application.

The pinhole glasses according to the present invention are provided with a speaker wirelessly connected to a smartphone instead of an earphone in the temple bar, so that the acoustic sound can be enjoyed while wearing the glasses.

The pinhole glasses according to the present invention can be also clearly viewed through the middle of the lens when viewing ordinary objects, and through the pinhole part placed on the top of the pinhole glasses when viewing a smartphone or computer monitor, or small letters at a single glance. In addition, the pinhole glasses of the present invention can prevent eye fatigue or dry eye by blocking bright light.

Further, it is characterized by being able to avoid the strange gaze and feeling of rejection of others in public places such as inside a train or bus, and can be worn without discomfort even when walking or driving.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
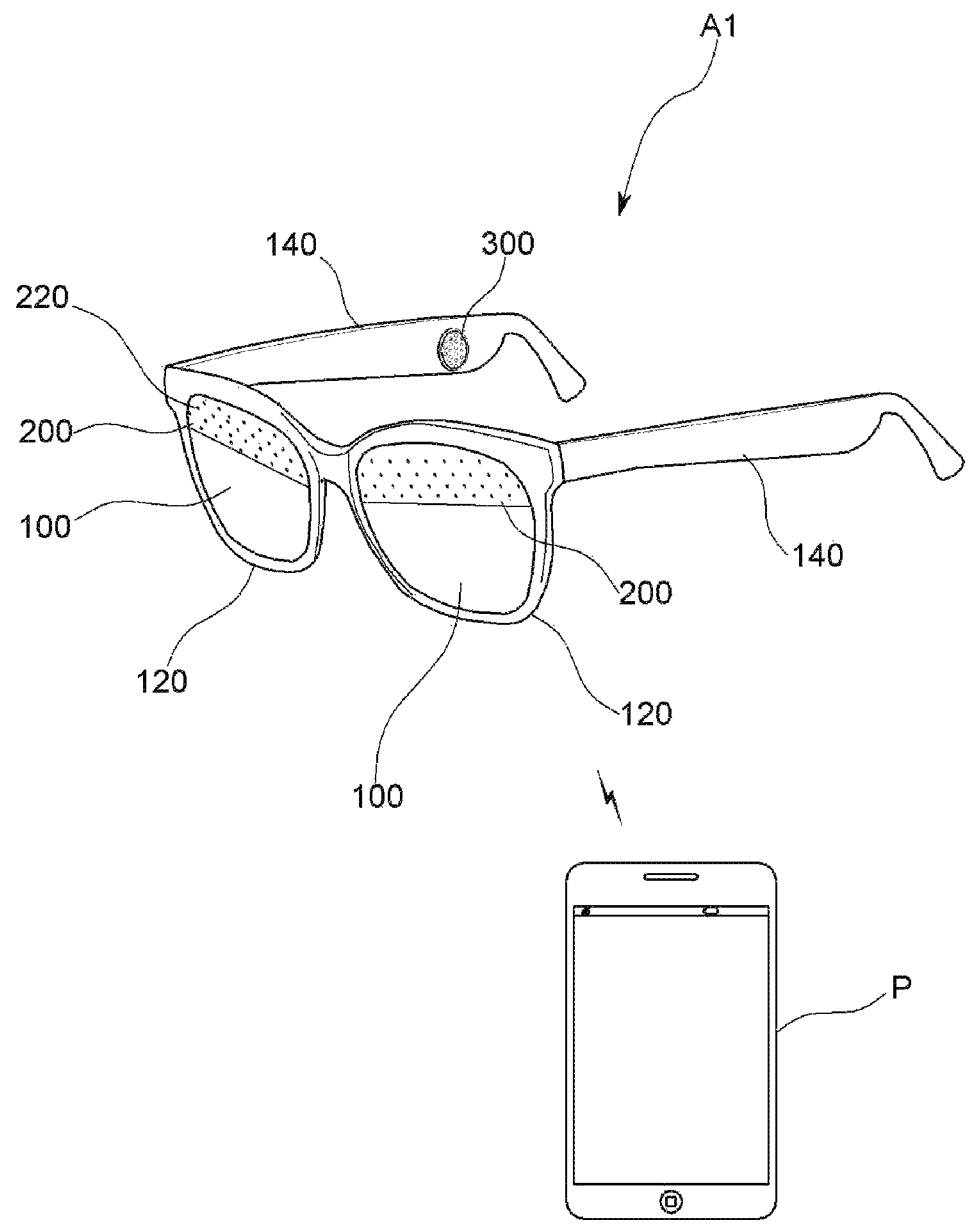
FIG. 1 is a perspective view of pinhole glasses according to the first embodiment of the present invention.
Figure 2:
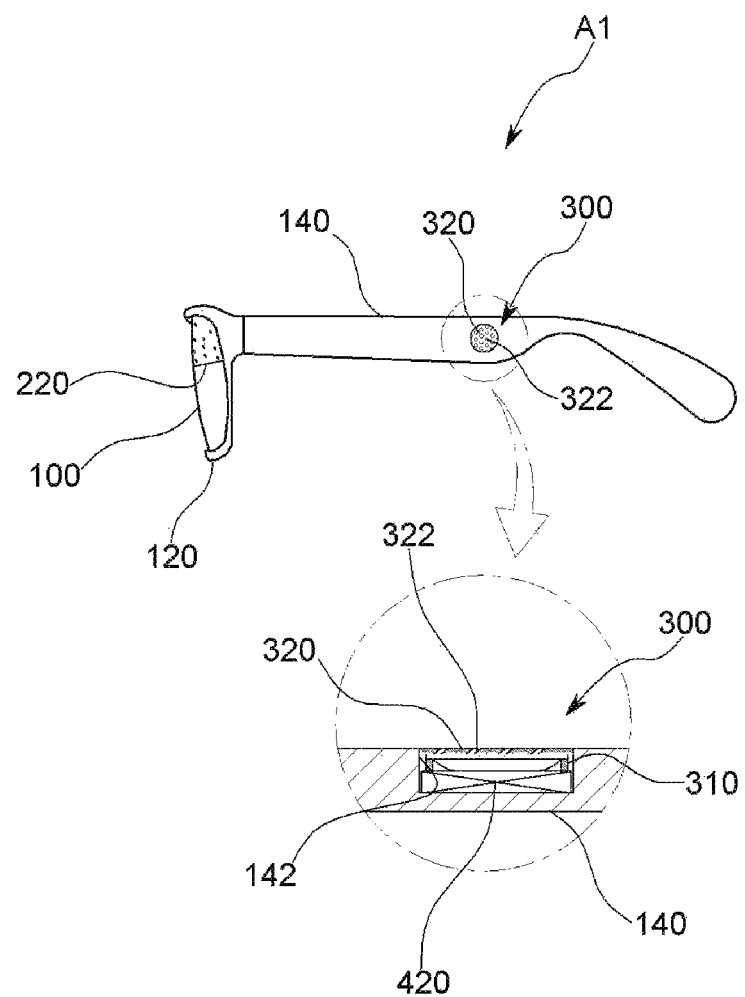
FIG. 2 is a side view of the pinhole glasses according to the first embodiment of the present invention.
Figure 3:
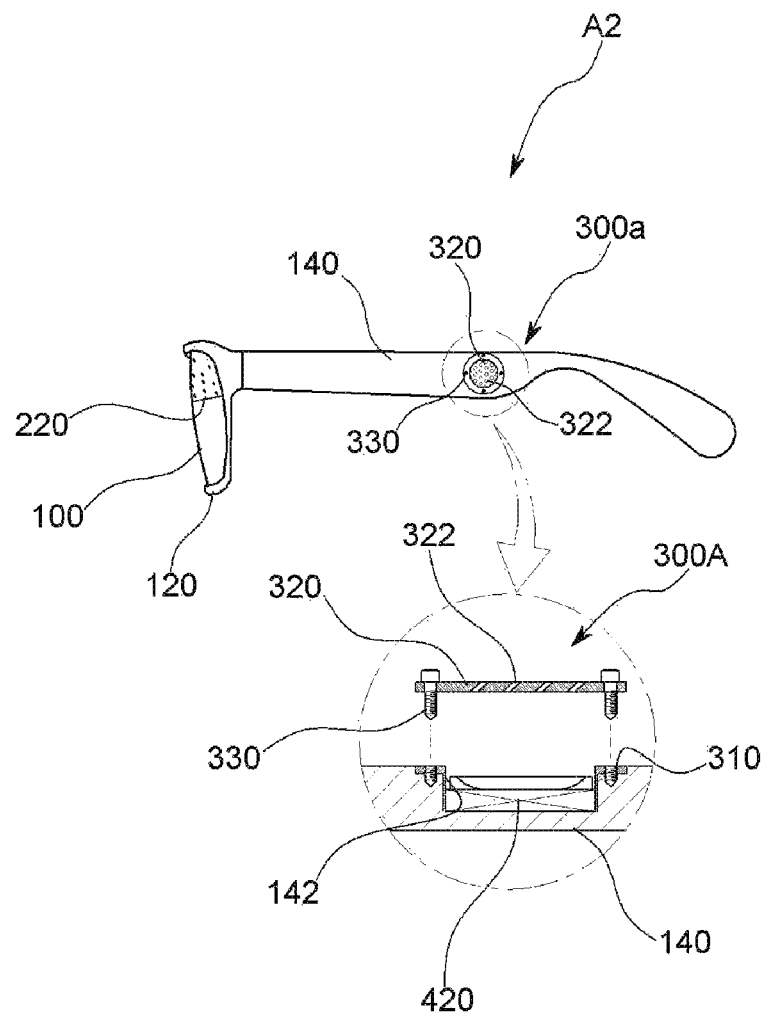
FIG. 3 is a side view of the pinhole glasses according to the second embodiment of the present invention.
Figure 4A:
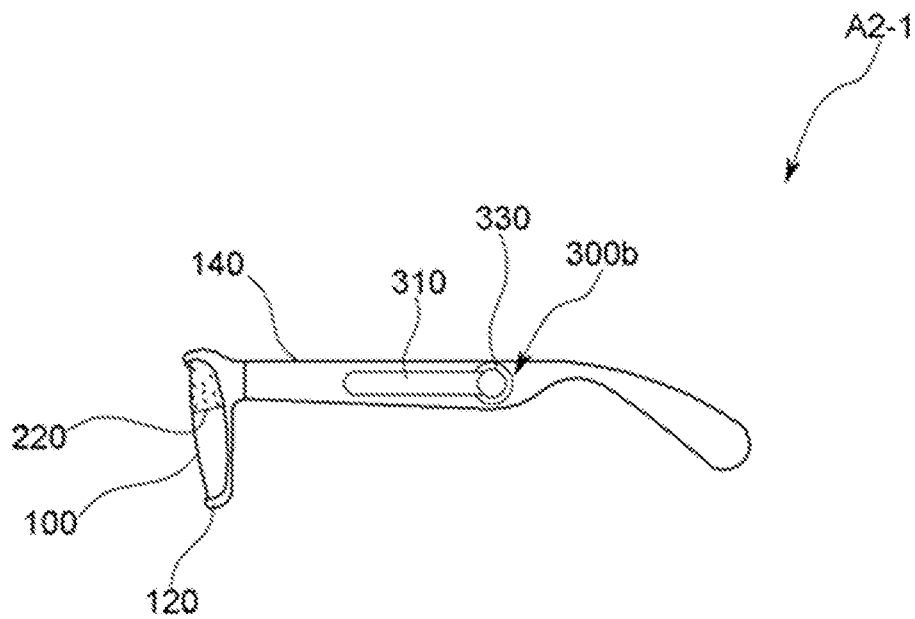
FIGS. 4A-4B are side views of the pinhole glasses according to the third embodiment of the present invention.
Figure 4B:
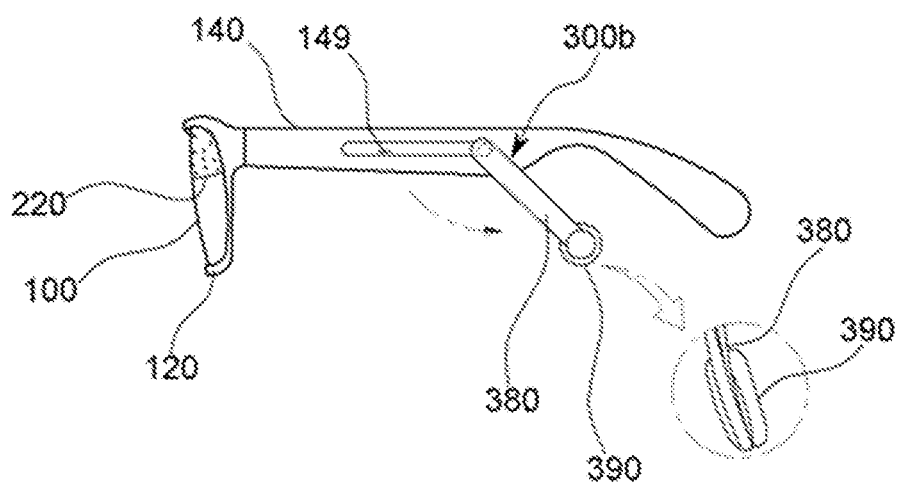
Figure 5:
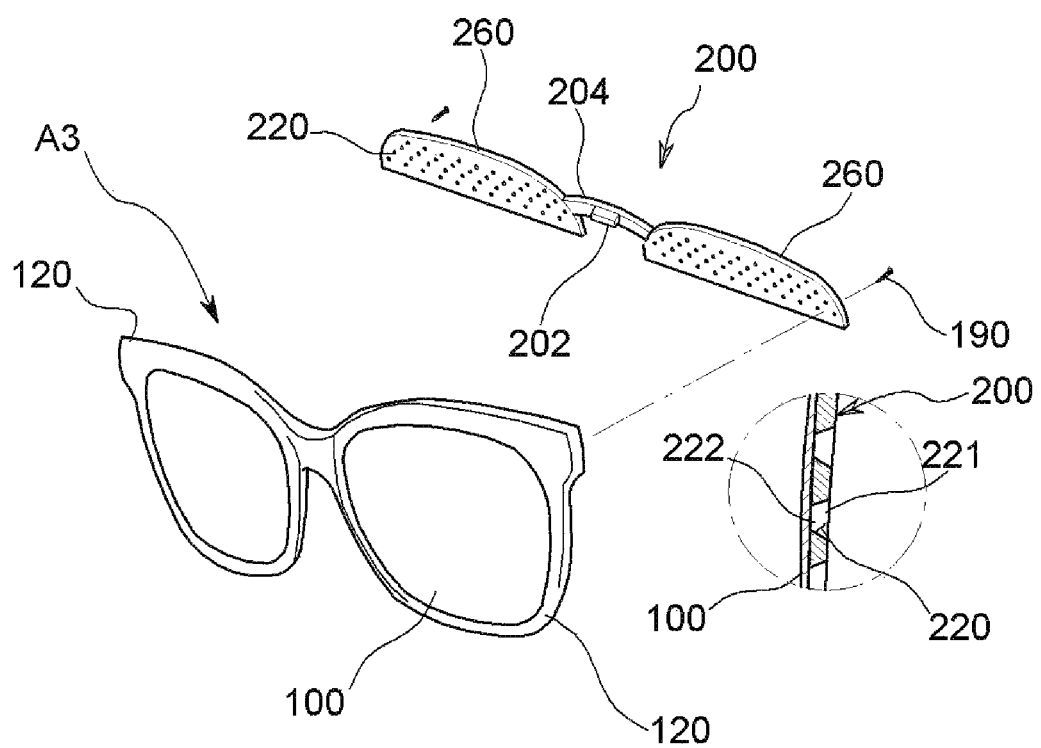
FIG. 5 is a perspective view of the pinhole glasses according to the fourth embodiment of the present invention, wherein the pinhole part is screwed into the frame.
Figure 6:
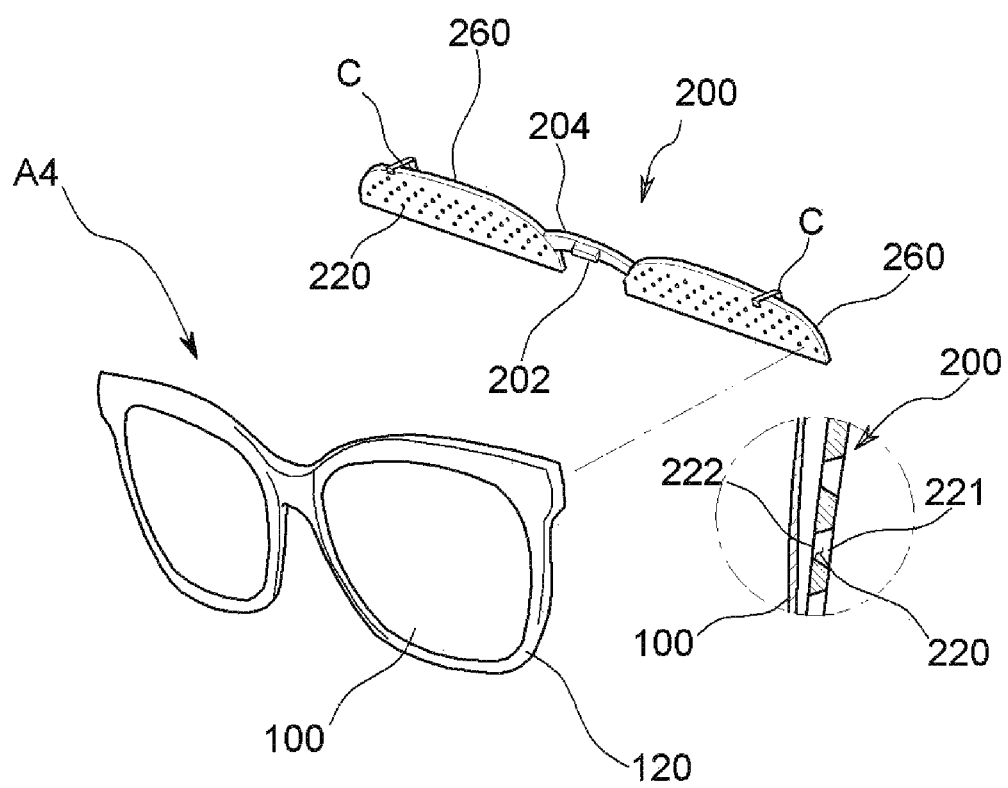
FIG. 6 is a perspective view of the pinhole glasses according to the fifth embodiment of the present invention wherein the pinhole glasses include a clip-fixed pinhole part.
Figure 7:
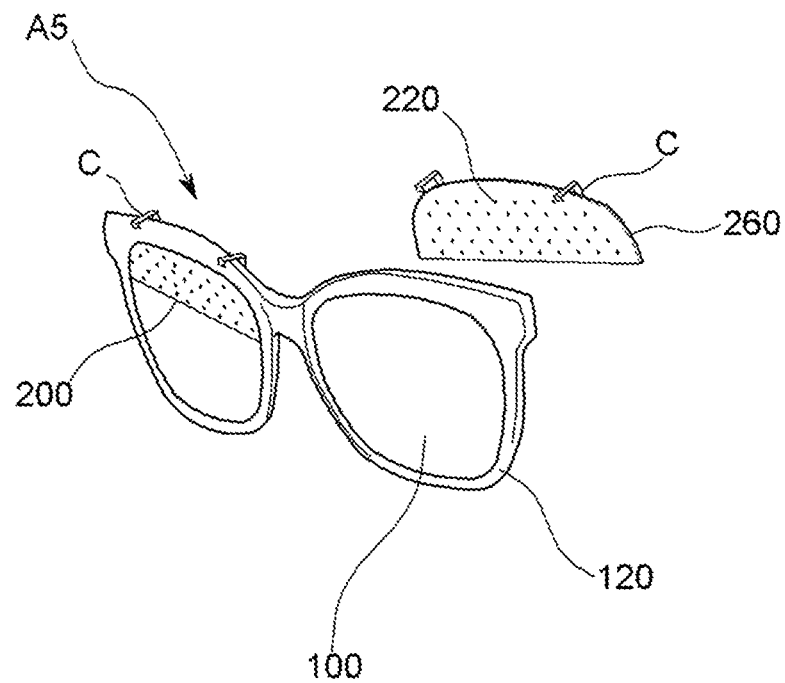
FIG. 7 is a perspective view of the pinhole glasses according to the sixth embodiment of the present invention, wherein two pinhole lenses are individually coupled to each of the frames.
Figure 8:
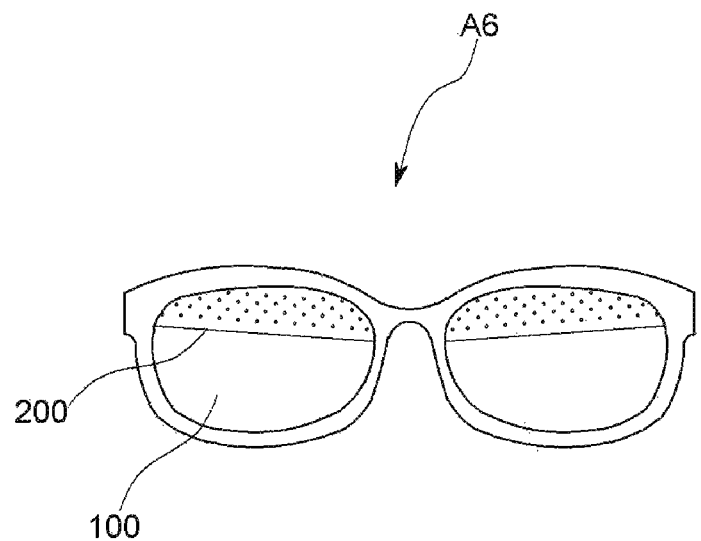
FIG. 8 is an exemplary view of the pinhole glasses according to the seventh embodiment of the present invention wherein pinhole lenses are applied to sunglasses or general glasses.
Figure 9:
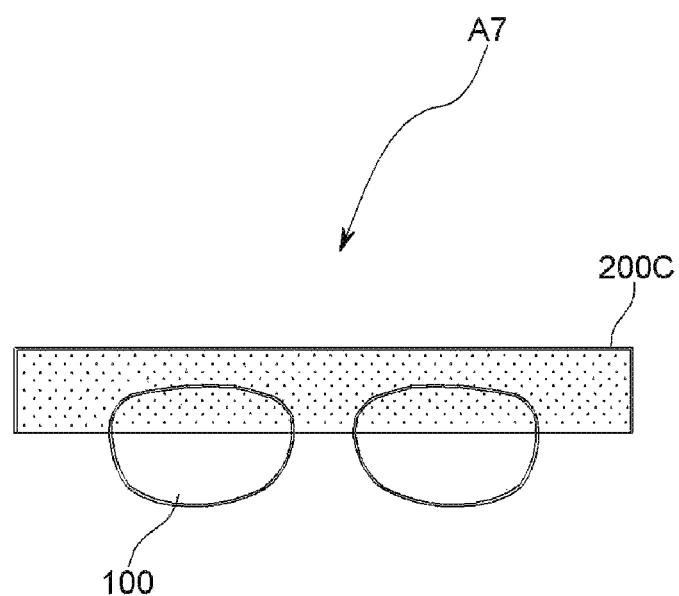
FIG. 9 is an exemplary view of the pinhole glasses according to the eighth embodiment of the present invention, wherein pinhole films are attached to the glasses.
Figure 10:
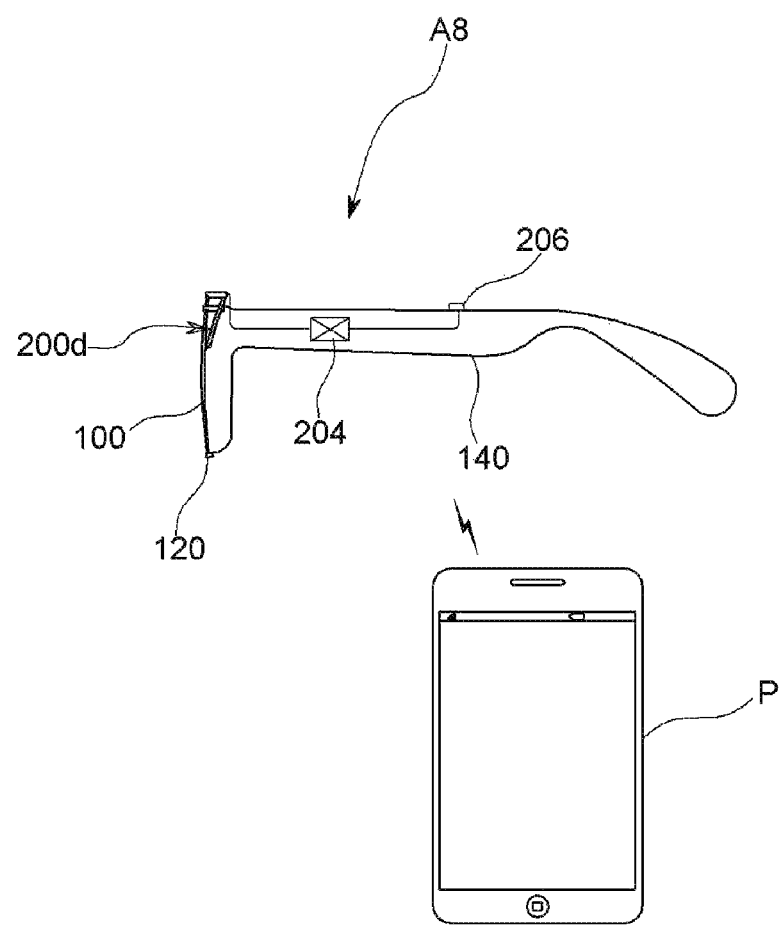
FIG. 10 is a perspective view of the pinhole glasses according to the ninth embodiment of the present invention, wherein a transparent display provided in the pinhole glasses.
Figure 11:
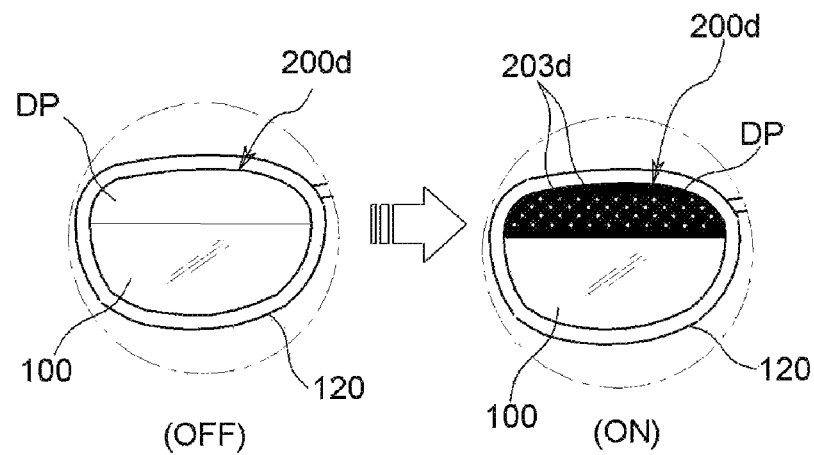
FIG. 11 is an exemplary view the pinhole glasses according to the ninth embodiment of the present invention wherein the operation of a transparent display is shown.
Figure 12:
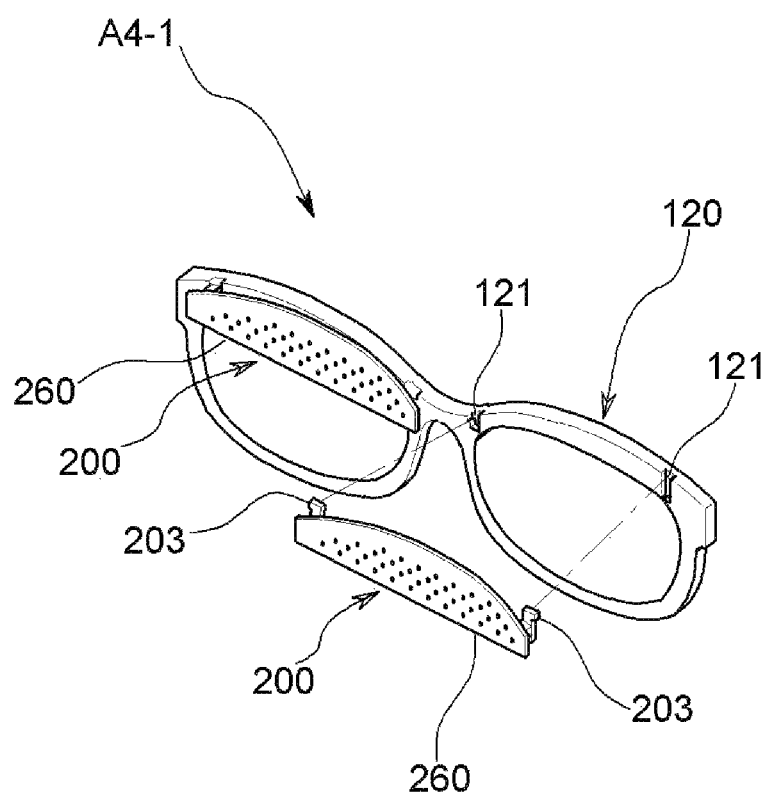
FIG. 12 is a perspective view of the pinhole glasses according to the tenth embodiment of the present invention.

Among the drawings, FIG. 1 is a perspective view of pinhole glasses according to the first embodiment of the present invention; FIG. 2 is a side view of the pinhole glasses according to the first embodiment of the present invention; FIG. 3 is a side view of the pinhole glasses according to the second embodiment of the present invention; FIGS. 4A-4B are side views of the pinhole glasses according to the third embodiment of the present invention; FIG. 5 is a perspective view of the pinhole glasses according to the fourth embodiment of the present invention, wherein the pinhole part is screwed into the frame; FIG. 6 is a perspective view of the pinhole glasses according to the fifth embodiment of the present invention wherein the pinhole glasses include a clip-fixed pinhole part; FIG. 7 is a perspective view of the pinhole glasses according to the sixth embodiment of the present invention, wherein two pinhole lenses are individually coupled to each of the frames. FIG. 8 is an exemplary view of the pinhole glasses according to the seventh embodiment of the present invention wherein pinhole lenses are applied to sunglasses or general glasses; FIG. 9 is an exemplary view of the pinhole glasses according to the eighth embodiment of the present invention, wherein pinhole films are attached to the glasses; FIG. 10 is a perspective view of the pinhole glasses according to the ninth embodiment of the present invention, wherein a transparent display provided in the pinhole glasses; FIG. 11 is an exemplary view the pinhole glasses according to the ninth embodiment of the present invention wherein the operation of a transparent display is shown; and FIG. 12 is a perspective view of the pinhole glasses according to the tenth embodiment of the present invention.

As shown in FIGS. 1 and 2, the pinhole glasses according to the first embodiment of the present invention comprise frames 120; the spectacle lenses 100 coupled to the frames 120; and the temple bars 140 hinged to both sides of the frames to be attached to the ears, wherein a pinhole part 200 detachably coupled to the frames 120 inside the spectacle lenses 100, includes two pinhole lens 260 which have a plurality of pinholes 220 to cover about a third of the upper portion of the spectacle lens 100.

The pinhole glasses according to the first embodiment of the present invention further comprise a speaker 300 installed in the temple bar 140 and configured to transmit sound toward an ear; and a control unit including a receiving unit 420 embedded in the temple bar 140, connected to the speaker 300 and to an external smartphone P in a wireless way (for example, Bluetooth).

The pinhole lens 260 is configured to cover an area of about a third of the top of the spectacle lens 100.

The pinhole lens 260 has a plurality of pinholes 220 capable of pinhole effect in a plastic film having a thickness of 1 mm or less. The pinholes are usually formed in 3 to 4 rows, but may vary depending on the vertical size. The pinhole part 200 is attached to the inside of the spectacle lens 100.

When looking straight ahead and seeing an object in normal times, the spectacle lens 100 is used. And when viewing a smartphone P, a computer monitor, or small print, the pinholes 220 of the pinhole lens 260 located on the upper part of the spectacle lens are used.

According to the first embodiment (A1) of the present invention, as shown in FIG. 2, the speaker 300 is composed of a holder 310 attached to a groove 142 formed in the temple bar 140, and a perforated cover 320 coupled to the holder 310. The holder 310 is integrally formed or detachably coupled to the temple bar 140.

The plurality of speaker holes 322 perforated in the cover 320 are formed to be inclined toward the ears, so that sound is easily transmitted to the ears.

According to the second embodiment (A2) of the present invention, as shown in FIG. 3, a speaker 300a is configured such that a plurality of screws 330 are coupled to the holder 310 and fastened to the temple bar 140 so that the speaker 300 can be removed by loosening the screw 330.

According to the third embodiment (A2-1) of the present invention, as shown in FIGS. 4A-4B, a speaker 300b includes a rail groove 149 formed in the temple bar 140, a speaker bar 380 that is engaged to the rail groove 149 and is folded or unfolded while moving along the rail groove 149, and an earphone 390 located at the end of the speaker bar 380.

The speaker bar 380 slides along the rail groove 149 and rotates at the end of the rail groove 149 toward the ear.

As shown in FIG. 4B, when using the earphone, the speaker bar 380 is configured to slide along the rail groove 149 and rotate at the end of the rail groove 149 to face the ear. In this way, the earphone 390 can be used as an ear speaker.

According to the fourth embodiment (A3) of the present invention, as shown in FIG. 5, the pinhole part 200 is configured to be detachable or attachable to the frames 120 of the spectacles or a sunglasses.

As shown in FIG. 5, the pinhole part 200 may be coupled to the frames 120 with screws 190 so as to be detachable from the frames 120.

The pinhole part 200 has two pinhole lenses in a substantially half-moon shape connected by a connecting rod 204, and is screwed to the frames 120 by screws 190 passing through each pinhole lens.

In addition, a protrusion 202 is formed on the outside of the connecting rod 204 to contact the bridge of the frames 120 so that the pinhole part 200 may be maintained in an inclined state.

A pinhole lens 260 is made of a slightly curved plastic plate with a thickness of about 1.7 mm or less, and is configured to cover an area of about a third of the top of general glasses or sunglasses.

The pinhole lens 260 is formed by perforating a plurality of pinholes 220 capable of pinhole effect in 3 to 4 rows based on the vertical size.

The pinhole 220 may be configured such that the diameter of the pinhole 220 increases toward the eye and gradually decreases toward the spectacle lens. That is, the pinhole 220 has an inner (eye side) diameter 221 larger than the outer diameter 222 to form a pinhole lens having a tapered cross section.

Alternatively, as shown in FIG. 6, the pinhole part 200 may have a fixing clip C so as to be detachable from the frame 120.

The pinhole part 200 has two pinhole lenses 260 of substantially half-moon shape connected by a connecting rod 204, and fixing clips C are formed on both pinhole lenses 260, respectively.

The pinhole part 200 may be coupled to the upper part of the spectacle frame 120 in a male and female form, and the pinhole lens 260 is configured to be inclined while being close to the eye.

Meanwhile, as shown in FIG. 12, according to the tenth embodiment (A4-1) of the present invention, the pinhole part 200 has a fitting hook 203 to be detachably coupled to the frame 120, and the frame 120 has a fitting groove 121 to fit the fitting hook 203.

Accordingly, the fitting hook 203 of the pinhole part 200 may be fitted into the fitting groove 121 of the frame 120, or the pinhole part 200 may be detached from the frame 120.

The pinhole lens 260 is inclined at a certain angle by the fixing clip C, and the eye's gaze passes through the pinhole 220, but portions other than the pinhole 220 cannot pass. The pinhole 220 has an inner (eye side) diameter 221 that is larger than the outer diameter 222, thereby forming a tapered cross section.

Due to this configuration, objects can be clearly viewed only with the pinholes 220.

As shown in FIGS. 6-8, the pinhole lenses 260 are coupled to the frames 120 by a fixing clips C.

As shown in FIG. 6, each of the two pinhole lenses 260 are individually formed corresponding to each spectacle lens, and a fixing clip C is formed thereon.

The pinhole lens 260 is coupled to the frame 120 by a fixing clip C or a fixing bolt (not shown), and may be detached to wipe the spectacle lens 100. The pinhole lens 260 is coupled to the spectacle lens 100 in parallel. Alternatively, as shown in FIG. 6, the pinhole lens 260 is configured to be inclined while being close to the eye.

The fixing clip C allows the top of the frame 120 and the pinhole part 200 to be inclined with an interval of about 5 mm, so that when the gaze is facing upward, the object can be seen more clearly through the pinhole lens 260, and the light coming from the top of the head can be blocked to maximize the pinhole effect.

The outer surface of the pinhole lens 260 is painted in the same color as the spectacle lens, and the inner surface is painted dark black.

The pinhole lens 260 has a plurality of pinholes 220 having a diameter of 0.9 mm to 1.2 mm to enable a pinhole effect.

The spacing among the pinholes 220 is 3 mm to 4 mm and the pinholes 220 are formed by perforation. It is preferable that the plurality of pinholes 220 are formed in 3 to 4 rows based on the vertical size of the pinhole part 200.

As shown in FIG. 8, the pinhole lenses 260 may be integrally attached to the inside of the spectacle lens 100. Alternatively, as shown in FIG. 7, each of pinhole lenses 260 may be individually coupled by a clip C.

When the pinhole lens 260 is integrally formed with the spectacle lens 100, sunglasses, gradation glasses, mirror glasses, etc. can be used without feeling rejected in everyday life, because it is possible to minimize the unnatural appearance of the pinhole part 200.

According to the eighth embodiment (A7) of the present invention, as shown in FIG. 9, an original plate 200C of the pinhole film is prepared by forming a pinhole film having a size of about 170 mm and 30 mm, in width and length, respectively, and then painting the pinhole film in various colors identical to the color of the spectacle lens 100.

After designing the shape of the spectacle lens 100, the plate 200C is cut and attached to the spectacle lens 100.

According to the ninth embodiment of the present invention, as shown in FIGS. 10 and 11, the pinhole glasses comprises frames 120 to which spectacle lenses 100 are coupled, and temple bars 140 that are hinged to both sides of the frames 120 to attached to the ears, and pinhole lenses 200d, wherein the pinhole lenses 200d are coupled to the inner side of the spectacle lenses 100, and have a plurality of pinholes 203d.

The pinhole lens 200d is made of a transparent display DP, and is formed in an upper area of about ⅓ of the spectacle lens 100.

The pinhole glasses have a control unit 204 for controlling color fluctuation of the transparent display DP and an on-off switch 206 for color fluctuation.

The switch 206 is preferably provided on the temple bar 140 of the glasses. The on-off operation of pattern formation of the transparent display DP may be controlled by an application installed in the smartphone P.

The user may turn on Bluetooth, connect it to the controller 204, and then run the application. Thereafter, the user may also operate the application to set a pattern such as the size of the pinhole 203d displayed on the transparent display DP and the distance between the pinholes 203d.

It may also be set to display various characters or information in addition to the pattern. When the user turns on the switch 206, a pinhole pattern may be displayed on the transparent display DP (right side of FIG. 11).

As a pinhole pattern, a number of transparent pinholes are formed on a black background. A transparent display DP is a display device that displays a variety of information on a panel having a property of transmitting light, so that the back of the screen is visible through transparent glass.

A thin film-shaped transparent OLED (Organic Light Emitting Display), a transparent liquid crystal display (LCD), and a transparent light emitting diode (LED), which are made using a transparent element, may be applied on the transparent substrate.

Transparent OLED displays can implement a transmittance of 40-50% or more at present, and transparent LCDs can implement a transmittance of about 20%, so there is a limit to transparency. Since it is formed only at the upper portion of the spectacle lens 100, it is not obstructed to secure a front view.

Therefore, when the transparent display DP is turned on by touching the switch 206 after wearing glasses, the background of the transparent display DP is discolored to black, and a plurality of transparent pinholes 203d are created to form a pinhole lens 200d.

Alternatively, after the smartphone P and the control unit 204 of the transparent display DP are connected via Bluetooth, the application is driven.

Thereafter, a program for a pinhole pattern suitable for the user's gaze, such as the size of the pinhole 203d displayed on the transparent display DP and the distance between pinholes, may be set by the application.

Alternatively, a phrase or pattern may be inserted in the application and displayed on the transparent display DP. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. Pinhole glasses comprising:
   spectacle frames;
   spectacle lenses coupled to the frames; and
   temple bars hinged to both sides of the frames to be attached to the ears, wherein a pinhole part detachably coupled to the frames to be attached to the ears, wherein a pinhole part detachably coupled to the frames inside the spectacle lenses, includes two pinhole lens which have a plurality of pinholes to cover about a third of the upper portion of the spectacle lens,
   wherein the pinhole lens is made of a transparent display, and has a control unit for controlling color fluctuation and an on-off switch, and a pinhole pattern is displayed on the transparent display by the on operation of the switch.

2. The pinhole glasses according to claim 1, wherein the pinhole part has two pinhole lenses in a substantially half-moon shape connected by a connecting rod, and is screwed to the frames by screws passing through each pinhole lens.

3. The pinhole glasses according to claim 1, wherein the pinhole part has two pinhole lenses in the shape of a half-moon connected by a connecting rod, and fixing clips are provided on both pinhole lenses.

4. The pinhole glasses according to claim 1, wherein the pinhole is configured such that the diameter of the pinhole increases toward the eye and gradually decreases toward the spectacle lens.

5. The pinhole glasses according to claim 1, wherein the switch is provided on the temple bar, and the on-off operation of pattern formation of the transparent display is controlled by an application installed in the smartphone.

6. The pinhole glasses according to claim 5, wherein the transparent display shows various characters or information in conjunction with the application.

7. The pinhole glasses according to claim 1, wherein the pinhole part has a fitting hook to be detachably coupled to the frame, the frame has a fitting groove to fit the fitting hook, the fitting hook of the pinhole part is fitted into the fitting groove of the frame, and the pinhole part is detached from the frame.

8. Pinhole glasses comprising:
   spectacle frames;
   spectacle lenses coupled to the frames; and
   temple bars hinged to both sides of the frames to be attached to the ears, wherein a pinhole part detachably coupled to the frames to be attached to the ears, wherein a pinhole part detachably coupled to the frames inside the spectacle lenses, includes two pinhole lens which have a plurality of pinholes to cover about a third of the upper portion of the spectacle lens,
   wherein the pinhole part has two pinhole lenses in a substantially half-moon shape connected by a connecting rod, and is screwed to the frames by screws passing through each pinhole lens, and
   wherein a protrusion is formed on the outside of the connecting rod to contact the bridge of the frames so that the pinhole lenses may be in an inclined state.

9. Pinhole glasses comprising:
   spectacle frames;
   spectacle lenses coupled to the frames; and
   temple bars hinged to both sides of the frames to be attached to the ears, wherein a pinhole part detachably coupled to the frames to be attached to the ears, wherein a pinhole part detachably coupled to the frames inside the spectacle lenses, includes two pinhole lens which have a plurality of pinholes to cover about a third of the upper portion of the spectacle lens,
   wherein the pinhole glasses further comprise speakers installed in the temple bars and configured to transmit sound toward ears; and a control unit including a receiving unit embedded in the temple bar, connected to the speaker and to an external smartphone in a wireless way, and
   wherein the speaker includes a holder attached to a groove formed in the temple bar, and a perforated cover coupled to the holder, the holder being integrally formed or detachably coupled to the temple bar, or the speaker being coupled to the holder fastened by a plurality of screws, and the plurality of speaker holes perforated in the cover are formed to be inclined toward the ears.

10. Pinhole glasses comprising:

spectacle frames;

spectacle lenses coupled to the frames; and temple bars hinged to both sides of the frames to be attached to the ears, wherein a pinhole part detachably coupled to the frames to be attached to the ears, wherein a pinhole part detachably coupled to the frames inside the spectacle lenses, includes two pinhole lens which have a plurality of pinholes to cover about a third of the upper portion of the spectacle lens, wherein the pinhole glasses further comprise speakers installed in the temple bars and configured to transmit sound toward ears; and a control unit including a receiving unit embedded in the temple bar, connected to the speaker and to an external smartphone in a wireless way, and wherein the speaker comprises the speaker bar configured to slide along a rail groove and rotate at the end of the rail groove, and an ear speaker located at the end of the speaker bar.

* * * * *